Nov. 6, 1951   J. J. PIROS ET AL   2,573,807
STILL
Filed Nov. 8, 1946
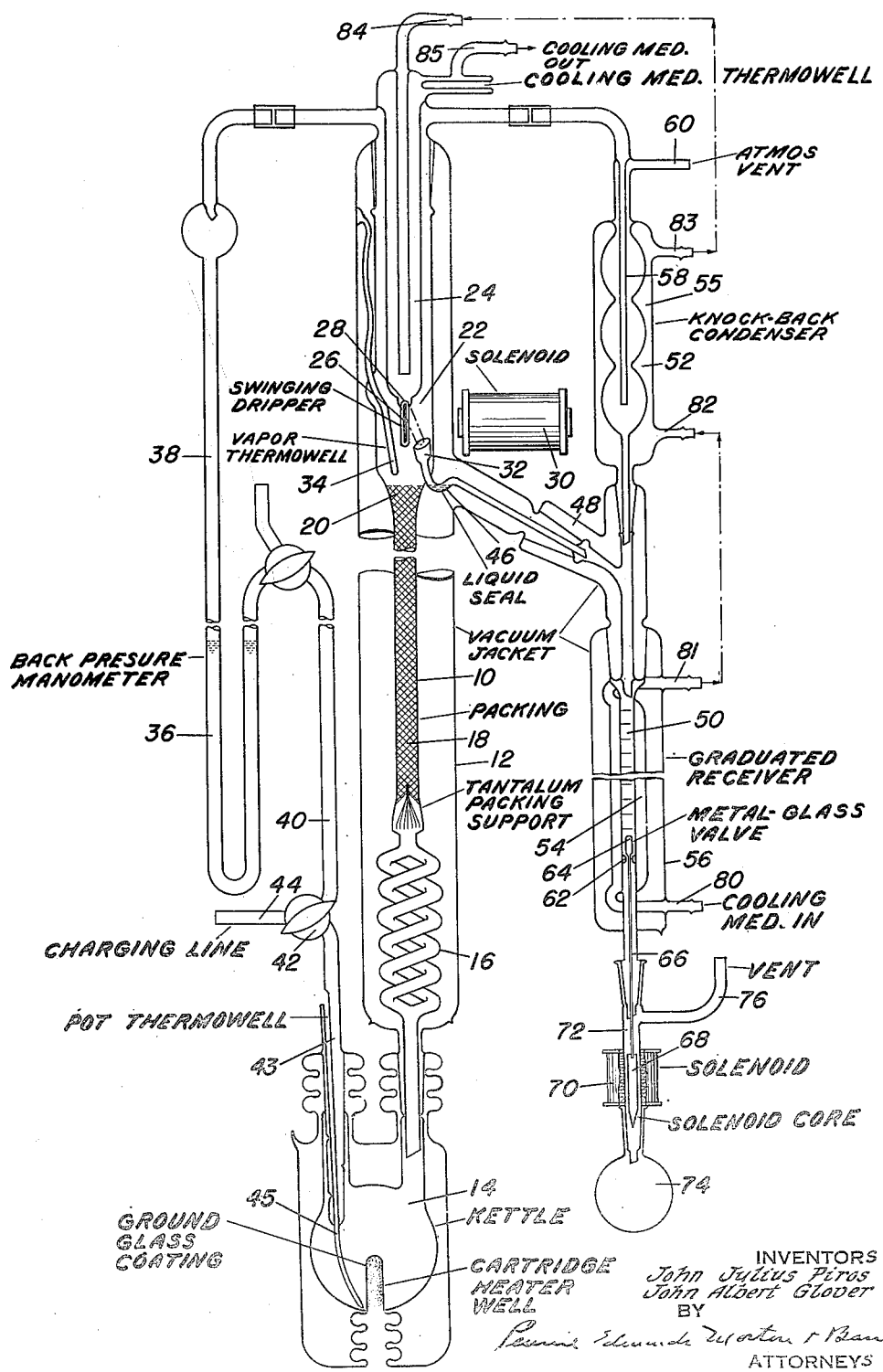
INVENTORS
John Julius Piros
John Albert Glover
BY
ATTORNEYS Patented Nov. 6, 1951

2,573,807

UNITED STATES PATENT OFFICE 2,573,807

STILL

John Julius Piros, Gary, and John Albert Glover, Munster, Ind., assignors, by mesne assignments, to Sinclair Research Laboratories, Inc., Harvey, Ill., a corporation of Delaware Application November 8, 1946, Serial No. 708,660

1 Claim. (Cl. 202—153)

This invention relates to an improved laboratory still suitable for the complete laboratory distillation of mixtures of liquids of varying boiling points, and in particular, mixtures containing low boiling fractions.

Products from various organic syntheses reactions contain forerunnings consisting of low boiling substances such as highly volatile hydrocarbons, light nitrogen and halogen compounds, ammonia, chlorine, etc., along with compounds boiling above room temperatures and frequently up to relatively high temperatures. Heretofore difficulties have been encountered in the precise batch fractionations of such materials. In atmospheric distillation, difficulties have been encountered through high losses of the more volatile forerunnings. The use of superatomspheric pressure to avoid this is objectionable because of difficulties in varying the pressure and the fact that the use of a constant pressure may result in pot temperatures high enough to bring about thermal decomposition. The use of vacuum distillation is frequently objectionable in that it is often impractical to obtain a sufficient sample of the overhead for chemical analysis.

The laboratory stills of the present invention are adapted for the complete and precise batch fractionation of mixtures containing low boiling as well as high boiling materials, and operate very efficiently with relatively small charging capacities of from less than 100 cc. up to about 3000 cc. or more. They can be operated effectively over a wide range of temperature, products containing materials boiling as low as −60° C. and as high as 350° C. having been efficiently separated by the use of the apparatus. Charging stocks varying from such materials as straight run casing-head gasoline to complex mixtures of products of organic syntheses such as the products of reaction produced in the direct amination of olefins with ammonia may be efficiently fractionated. The stills, while primarily designed for operation at atmospheric pressure, can, by the replacement of the atmospheric take-off assembly by a vacuum manifold assembly, be used for vacuum distillation.

The column of the still of the invention consists of a vacuum-jacketed packed column, which may range in diameter from about 10 mm. to about 25 mm. and in packed section length from about 50 to about 150 cm., for stills with charging capacities ranging from about 100 cc. to about 3000 cc. The packed section of the column may, of course, be larger or smaller, but in general the sizes given are suitable for the stated charging capacities.

The column is packed with a suitable packing material, advantageously small, single-turn helices, which for non-corrosive products may be of stainless steel, or for highly corrosive materials, of glass; or may be made of other suitable material.

To provide for expansion or contraction of the column within the vacuum jacket, it is provided with a double helical coil below the packing section. The packing material is supported by a spider above this double helical coil, the spider being advantageously made of tantalum or other suitable material. To minimize flooding, the packing section is flared out at the top somewhat. Above the packing section, the column has a section with an expanded diameter in which is positioned a removable cold finger, which serves as a total condenser. At the bottom of the cold finger there is provided a swinging dripper, having a glass enclosed soft iron core, which can, by the operation of a magnet outside of the jacket, be tilted so that the liquid dripping from it falls into a take-off line or back into the packed section to serve as reflux. By the use of an appropriate timer in the support of the magnet, the reflux ratio is readily adjusted to any desired value.

The take-off tube, provided with a liquid seal, passes through the vacuum jacket and through a silvered vacuum jacketed adapter, to a receiver provided with a jacket through which a cooling medium is circulated, which in turn has an unsilvered vacuum jacket to prevent condensation from interfering with readings of the receiver. Above the receiver, and connected to the take-off line adapter is a knock-back condenser which serves to return to the receiver any vapor formed in the flow of the material through the adapter, so that between the action of the total condenser in the column, the knock-back condenser above the receiver and the cooled receiver, all of the material vaporized is recovered as liquid in the receiver if the cooling medium used is adequately cold.

The top of the column and the knock-back condenser are equalized in pressure, and the top of the total condenser connected to the atmospheric vent, by a tube leading to the bottom of the knock-back condenser, which in turn communicates with the atmospheric vent.

To avoid difficulties in removing products from the receiver, and to avoid contamination of the product with stop-cock grease or the like, a special type of outlet is used, instead of a stop-cock. This consists of a nickel valve needle having a spherical bottom ground into the top of a glass seat provided at the bottom of the receiver, the needle being connected to a nickel rod which in turn leads to a nickel solenoid core of sufficient weight to provide a non-leaking seal between the glass seat and the nickel valve needle. By energizing the solenoid the nickel core can be raised the short distance necessary to permit liquid in the receiver to flow down to a collecting flask.

To assist in controlling the distillation, a back pressure manometer to measure the pressure drop across the packing section and suitable thermowells, in particular, in the pot or kettle and in the vapor space above the packing section are provided.

The invention will be further described in conjunction with the appended drawing which illustrates a still which embodies the invention.

In the still illustrated, there is provided a fractionating column 10 having a silvered vacuum jacket 12, a suitable connection to the pot or kettle 14, a double helical coil 16 to provide expansion and contraction, a packing section 18 which is expanded somewhat at the top as shown at 20, and a vapor space 22 into which projects the cold finger 24. Advantageously, to permit observation of the operation of the column and, in particular, to check on flooding and the like, the jacket is silvered with a ⅛" strip along its length unsilvered to permit observation. The higher the vacuum in the permanently sealed vacuum jacket 12, the better is the operation of the column. In general, as will be pointed out, the column is intended to operate adiabatically, and the efficient insulation and low heat capacity of the vacuum jacket is of marked advantage for this purpose.

Just above the double helical coil 16 is provided a packing support in the form of a spider consisting of thin tantalum wires, fastened together at their approximate mid-points and then bent into a cone shape. Difficulties due to flooding at the bottom of the column are minimized if the spider is placed so that the apex of the cone is up. The packing consists of small single turn helices of stainless steel or, where corrosive liquids are to be handled, of glass. Other suitable material may be used. Packing consisting of ³⁄₆₄" or ₃₂" diameter helices may be used with advantage. To assist in the packing a small layer, for example, a ½" layer, of ⅛" helices may be placed on the packing support before the smaller helices are put in place. In packing the column care should be taken to insure a uniform density of packing throughout this section. This may be accomplished by tapping the column gently while introducing the separated helices.

At the bottom of the cold finger 24 is provided a dripper 26 which is attached to the cold finger by a pivot 28 permitting it to oscillate. It is provided with a soft iron core. Positioned alongside of the jacket and at the level of the dripper is a solenoid 30. When this is energized it attracts the dripper 26 to the side so that liquid falling from it drips into the collecting line 32. When the solenoid is unenergized the dripper hangs vertically and the liquid falling from it goes back to the packed section of the column and serves as reflux. By the use of an appropriate timer in the energizing circuit of the solenoid, the reflux ratio of the column is readily controlled within almost any desired limits. A thermowell 34 passes through the jacket 12 and protrudes into the vapor space at the top of upper column 10 to permit the determination of the temperature at that point. Advantageously it goes to within about ½" of the top of the packed section, and is located behind the plane of oscillation of the dripper to avoid the possibility of super-cooled condensate falling on it and distorting the temperature readings. A back pressure manometer 36 connected to the top of the vapor space by line 38 and to the vapor space of the kettle by line 40, connected to the three-way stop-cock 42 which is also connected to the charging line 44, is provided to aid in control of the distillation and in particular, to avoid undue flooding.

The receiving line 32 is provided with the liquid seal 46, and discharges into the adapter 48 which is simply a vacuum jacketed, silvered conduit to connect the column with the receiver 50 and the knock-back condenser 52. The calibrated receiver 50 is provided with a jacket 54 through which a cooling medium may be circulated, and surrounding this is an unsilvered vacuum jacket 56, the purpose of which is to prevent condensation of water from the air on the jacket 54 which would obscure readings of the receiver. The top of the adapter 48 leads to a knock-back condenser 52 provided with a jacket 56 through which the cooling medium circulates. The lower part of this condenser is connected by the tube 58 to the top of the vapor space of the column 10 to provide pressure equalization. At the top of condenser 52 is provided an atmospheric vent 60. At the bottom of the receiver 54 there is provided a glass seat 62 and a nickel valve needle 64, the two forming a ground joint. The needle 64 is supported by a nickel rod 66 in turn connected to the solenoid core 68 positioned within the solenoid 70, and all within the tube 72 which leads to the collecting flask 74. The ground joint between the seat 62 and the needle 64 provides an adequate liquid tight seal for the bottom of the receiver, the needle being held in place by the weight of the rod 66 and the core 68. Energizing of the solenoid 70 lifts the needle 64 enough to permit the liquid within the receiver to flow to the collecting flask 74. Care should be taken that the needle is not lifted too far from the seat to prevent the liquid from passing out as a slug or gurgling on its passage through the tube 72. The tube 72 is provided with the vent 76.

Charging stock to the kettle is supplied through the line 44 and the three-way stop-cock 42. Through the same opening through which the line 43 passes and which serves as the charging line and also as one of the lines to the back-pressure manometer, passes the thermowell 45 used to measure the temperature of the liquid in the kettle or pot 14. The kettle may be heated by an ordinary heating mantle, or where materials containing very low boiling constituents are to be distilled, the kettle may be vacuum jacketed and heated by a cartridge heater as illustrated in the drawing.

The cooling medium for the receiver, the condenser above the receiver and the total condenser at the top of the column, flows through the lines 80, 81, 82, 83, 84 and 85, connected in series.

For operation at low temperatures, the silvered vacuum jacket 12 around the column 10 supplies adequate insulation to provide substantially adiabatic operation, its insulating properties being sufficient for that purpose and its low heat capacity assisting materially. For operation at higher temperatures, for example, at temperatures above about 100° C. it is advisable to heat the outside of the jacket. Above 150° C., radiation losses, even when the vacuum jacket is efficiently silvered, are serious enough to reduce the efficiency of the column operation, especially with low boil-up rates. By heating the outside of the jacket, as by winding the outside with Nichrome ribbon on glass cloth tape and then covering with glass wool, radiation losses are minimized and efficient operation with overhead vapor temperatures as high as 350° C. becomes feasible. Advantageously a temperature about half way between the pot temperature and the overhead vapor temperature as measured by thermocouples in the wells 34 and 45 is used.

In using the still illustrated for the fractionation of a sample, the cooling medium, which may be a material such as acetone or isopropyl alcohol cooled by heat exchange with Dry Ice in acetone or isopropyl alcohol, is first circulated through the receiver, the condenser above it, and the condenser at the top of the column until the temperature of each of these is brought down to the proper operating level for the liquid to be distilled. The mixture to be fractionated, if it contains low boiling constituents, is thoroughly chilled as by Dry Ice before charging to the kettle. Since a liquid seal 46 must be maintained in the line 32 to prevent loss of vapor through the take-off line, the cycle timer operating the solenoid 30 is adjusted to give a high reflux ratio, say 100:1, during this operation. The charge is admitted slowly through the line 44, the stop-cock 42 and the line 43. If it is introduced too rapidly the packing may be blown from the packing tube. When the charge is all in the kettle, heat is applied to the kettle, in the case of mixtures containing low boiling constituents under discussion by the cartridge heater, at a rate sufficient to flood the packing. The packing is then allowed to drain and the heat input adjusted to give a boil-up rate about two-thirds the flooding rate. After the column has reached equilibrium at this boil-up rate, the reflux ratio is reduced to the desired ratio for the distillation of the particular material, and the distillation proceeds without further difficulty.

We claim:

In a laboratory still for the fractional distillation of mixtures of liquids of different boiling points which comprises a kettle, a packed column connected thereto, a total cold finger condenser above the packed column and a receiver, the improvement comprising a receiving line having a liquid seal therein, positioned with its inlet above the packed column and its outlet leading to the upper end of the receiver; means for depositing in the inlet of the receiving line condensate dripping from the lower end of the cold finger condenser; a knockback condenser, mounted above the receiver and in communication therewith and having its upper end vented to the atmosphere; and a tube, communicating with the upper end of the cold finger condenser and passing downwardly through the inside of the knockback condenser to communicate with the lower part thereof.

JOHN JULIUS PIROS.
JOHN ALBERT GLOVER.

REFERENCES CITED

The following references are of record in the file of this patent:

UNITED STATES PATENTS

| Number | Name | Date |
|---|---|---|
| 2,218,624 | Robertson | Oct. 22, 1940 |
| 2,251,185 | Carter | July 29, 1941 |
| 2,398,807 | Scovill | Apr. 23, 1946 |
| 2,427,142 | Hornbacker | Sept. 9, 1947 |

OTHER REFERENCES

Convenient Reflux Regulator for Laboratory Stills, by J. H. Bruun, Industrial and Eng. Chemistry, Anal. ed., vol. 2, 1930, pages 187, 185.

Industrial and Engineering Chemistry, vol. 18, 1946, pages 724, 673 to 677, 448 to 450.

Industrial Eng. Chemistry, Anal. edition, vol. 12, page 329, vol. 13, page 626.